Aug. 7, 1923.
G. W. PRICE ET AL
SHAFT COUPLING
Filed May 21, 1921
1,464,337
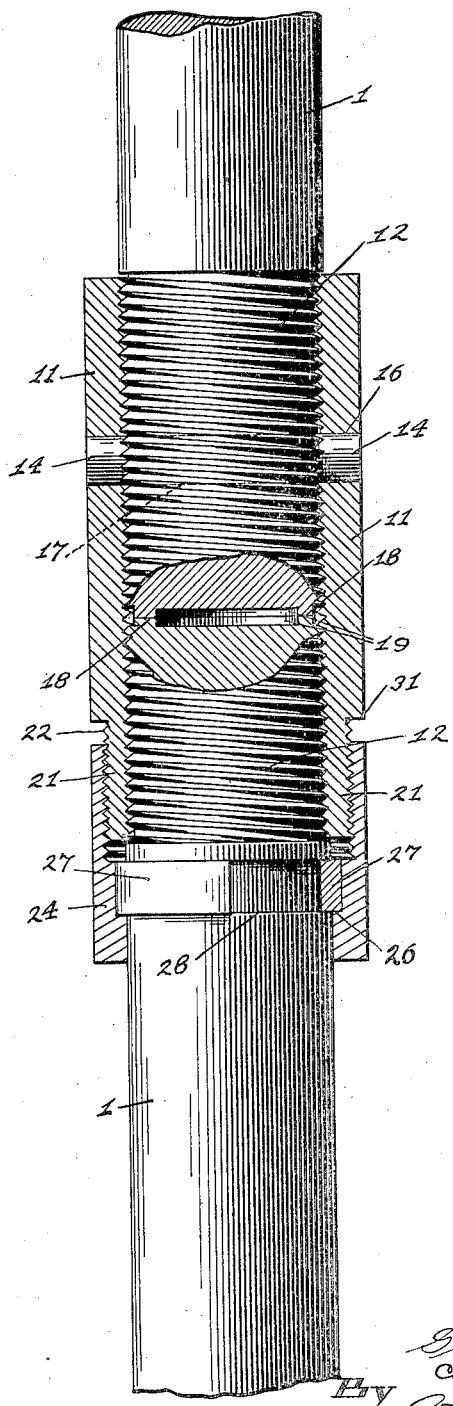

Patented Aug. 7, 1923.

1,464,337

UNITED STATES PATENT OFFICE.

GOMER W. PRICE AND CURT F. ZIMANSKY, OF SAN FRANCISCO, CALIFORNIA, ASSIGNORS TO G. W. PRICE PUMP AND ENGINE COMPANY, OF SAN FRANCISCO, CALIFORNIA.

SHAFT COUPLING.

Application filed May 21, 1921. Serial No. 471,459.

*To all whom it may concern:*

Be it known that we, GOMER W. PRICE and CURT F. ZIMANSKY, citizens of the United States, residing in the city and county of San Francisco and State of California, have invented a new and useful Improvement in a Shaft Coupling, of which the following is a specification.

Our invention relates to improvements in couplings for line shafts and the like wherein threaded sleeves of different pitch operate to couple the adjacent ends of shaft sections in alignment and to prevent uncoupling of said sections when normally rotated or reversed.

Our invention is particularly directed to couplings for pump shafts arranged to be operated in a shaft casing or the like wherein a coupling of the least possible transverse area is required and where the sides of said coupling may be subject to frictional resistance against the sides of the casing.

The primary object of our invention is to provided an improved shaft coupling for pump shafts.

Another object of our invention is to provide improved means for locking the sections of a sectional pump shaft against uncoupling during reversed operation.

A further object is to provide an improved shaft coupling of small transverse area.

A still further object is to provide a coupling of the character described adapted to facilitate the uncoupling of shaft sections and the reassembling thereof into their former relationship.

A still further object is to provide improved means for retaining the adjacent ends of adjacent sections in rigid contact and correct alignment.

We accomplish these and other objects by means of the device disclosed in the drawings forming a part of the present specification wherein like characters of reference are used to designate similar parts throughout said specification and drawings.

The figure is a broken side elevation partly in section of the ends of two sections of shaft coupled by our improved coupling.

Our improved coupling comprises a sleeve 11 internally threaded to receive the threaded ends 12 of adjacent sections of a shaft 11. The sleeve 11 is rigidly and permanently secured to the end 12 of one of the shaft sections in any suitable manner such as welding, or by means of a pin 14 driven into rigid engagement with apertures 16 in the sleeve 11 matching with a transverse aperture 17 in the end 12 of the shaft section as disclosed in the drawings. The adjacent end 12 of the adjacent section of the shaft 1 is threaded into the sleeve 11 and advanced to bring an annular bearing surface 18 formed on the end thereof into rigid contact with a similar bearing surface upon the adjacent end of the adjacent section to which the sleeve 11 is secured. The annular bearing surfaces are formed by providing a centrally disposed counter bore 19 at each end of each shaft as shown in Fig. 2 of the drawings to insure accurate alignment of the shaft sections and to prevent any bending stress at the joint due to any irregularity or unevenness of the bearing surface at the ends of the shaft sections.

The sleeve 11 is provided with a reduced portion 21 at the end receiving the unsecured shaft section, said reduced portion having threads 22 of a pitch less than the pitch of the interior threads receiving the ends 12 of the shaft sections 1. A second sleeve 24 is internally threaded at one end thereof to engage the reduced portion 21 of the sleeve 11 and is provided at the other end with an internal annular flange 26 neatly fitting the shaft 1 and providing a shoulder adapted to bear against a split ring 27 retained by an annular groove 28 formed in the shaft 1 adjacent the threaded end 12 thereof as shown in Fig. 2 of the drawings.

In operation our invention is as follows: The sleeve 11 having been secured to one end of one section of the shaft 1, a sleeve 24 is fitted over the end of the adjacent section of the shaft 1, and said section threaded into the sleeve 11 to bring the adjacent bearing surfaces 18 into contact. A split ring 27 is now fitted to the annular groove 28, and the sleeve 24 advanced over the ring 11 to engage the threads 22 of the sleeve 11. The sleeve 24 is advanced along the threads 22 until further movement is prevented by engagement of the flange shoulder 26 with the ring 27.

The threads of both the shaft ends 12 and the sleeve 24 are made to oppose the direction of rotation of the shaft 1 when driven in the normal operating direction so that normally the rotation of the shaft 1 will operate to advance both the sleeve and the shaft end to more rigid engagement with their respective threads on the sleeve 11. When the shaft is driven in the reverse direction, the normal tendency of the shaft end 12 to recede from the sleeve 11 is prevented by engagement of the ring 27 with the flange 26 of the sleeve 24, thereby jambing the sleeve 24 upon the threads 22 upon the outer side of the sleeve 11. Should the sleeve 24 contact at any point within the casing 7 sufficiently to cause sufficient frictional resistance to rotate the sleeve 24 upon the sleeve 11, the shaft 1 will immediately move within the sleeve 11. As the pitch of the inner and outer threads is not the same, the movement of the shaft will bring the ring 27 into contact with the flange 26 and the threads will be jambed as above explained. In this manner it is readily seen that in order for the shaft to become uncoupled during operation it would be necessary for the shaft 1 and the sleeve 11 to be rotated at different rates varying in the exact degree as the pitch of their respective threads.

As the tendency for the shaft to be unscrewed from the sleeve 11 is in every instance greater than the tendency of the sleeve 24 to be unscrewed from the sleeve 11, the two will at all times be locked from uncoupling by means of the differently pitched threads.

The threads 22 should be made upon a reduced portion of the sleeve 11 to provide a shoulder 31 of a diameter equal to or greater than the diameter of the sleeve 24 in order to prevent excessive friction against the sleeve 24 should the lateral play of the shaft 1 be sufficient to allow the sleeve to engage the inner side of the shaft casing.

To uncouple the sleeve for repair or other purpose, the sleeve 11 is held in a suitable clamp or vise and the sleeve 24 turned independently by means of a suitable wrench to disengage the threads 22 and permit the unsecured shaft end 12 to be unscrewed from the sleeve 11. The sections may now be reassembled in their former true relationship without altering the total length of the shaft by causing a greater or lesser number of threads to be engaged by the coupling, as our invention provides that the ends of adjacent shafts be held in rigid contact.

The transverse area of our improved coupling is but very slightly greater than that of the shaft itself, thereby permitting the use of a shaft casing of much lesser diameter than is possible with couplings of the flange type or other types commonly employed for the purpose.

Having thus described our invention, what we claim as new and desire to secure by Letters Patent is:

1. A pump shaft comprising sections threaded at both ends thereof; a sleeve screwed onto adjacent ends of adjacent sections; means for rigidly securing the sleeve to one section, said sleeve being arranged to be tightened upon the other section when the shaft is rotated in the normal direction; and a second sleeve rotatably mounted upon the other section and screwed upon the first sleeve to jamb the threads of said other section against the threads of the first sleeve to prevent rotation thereof on said section when the shaft is rotated in the opposite direction.

2. A pump shaft comprising sections counterbored axially and threaded peripherally on both ends thereof, said counterbores providing annular areas of contact between adjacent ends of adjacent sections to align the same; a sleeve screwed upon said threads to maintain contact of said adjacent ends; and means for normally preventing rotation of the sleeve upon the threads.

3. A pump shaft comprising sections counterbored axially and threaded peripherally on both ends thereof, said counterbores providing annular areas of contact between adjacent ends of adjacent sections to align the same; a sleeve screwed upon said threads to maintain contact of said adjacent ends; means for rigidly connecting the sleeve to one section; and means for jambing the threads of said sleeve against the threads of the other section to prevent rotation of said sleeve.

4. A pump shaft comprising sections counterbored axially and threaded peripherally on both ends thereof, said counterbores providing annular areas of contact between adjacent ends of adjacent sections to align the same; a sleeve screwed upon said threads to maintain contact of said adjacent ends; means for rigidly connecting the sleeve, to one section; and a second sleeve rotatably mounted upon the other section and screwed upon the first sleeve with threads of a different pitch whereby rotation of the first sleeve will tend to jamb both sets of threads.

5. A pump shaft comprising sections threaded on both ends thereof; a sleeve screwed upon said threads to connect said sections; means for rigidly connecting said sleeve upon one section to prevent rotation of the sleeve thereon, said sleeve being arranged to be tightened upon the other section when the shaft is rotated in the normal direction; and a second sleeve rotatably mounted upon the other section and screwed upon the first sleeve with threads of a different pitch whereby rotation of the first sleeve and section will tend to jamb the threads of said sleeve upon the threads of the other section and second mentioned sleeve when the shaft is rotated in the opposite direction.

6. A pump shaft comprising sections threaded at both ends and having an annular groove adjacent the threaded portion of one end thereof; a sleeve screwed upon the threaded ends of adjacent ends to connect the grooved end of one section to the ungrooved end of the adjacent section; means for rigidly securing said sleeve to the ungrooved section end; a second sleeve rotatably mounted upon the other section and screwed upon the first sleeve with threads of a different pitch; and means engaging said second sleeve and the groove whereby a rotation of the shaft section within the first sleeve will operate to jamb the threads of the second sleeve to prevent uncoupling.

7. A pump shaft comprising sections threaded at both ends and having an annular groove adjacent the threaded portion of one end thereof; a sleeve screwed upon the threaded ends of adjacent ends to connect the grooved end of one section to the ungrooved end of the adjacent section; means for rigidly securing said sleeve to the ungrooved section end; a second sleeve rotatably mounted upon the other section and screwed upon the first sleeve with threads of a lesser pitch; an internal annular flange formed upon one end of said second sleeve; and a split ring mounted within the groove of the shaft section and arranged to engage said internal flange whereby a rotation of the shaft section within the first sleeve will operate to jamb the threads of the second sleeve to prevent uncoupling.

8. A pump shaft comprising sections threaded at both ends thereof; a sleeve screwed onto adjacent ends of adjacent sections; means for securing the sleeve to one of the sections, said sleeve being arranged to be tightened upon the other section by rotation of the shaft in its normal direction; an externally threaded reduced portion formed upon the sleeve at the end remote from the section to which said sleeve is secured; and a second sleeve rotatably mounted upon the other section and screwed upon the first threaded reduced portion of the first sleeve to jamb the threads of said other section against the threads of the first sleeve to prevent rotation thereof on said section when the shaft is rotated in the opposite direction, said second sleeve being of an outer diameter substantially equal to the diameter of the first mentioned sleeve.

In witness whereof we hereunto set our signatures.

GOMER W. PRICE.
CURT F. ZIMANSKY.